(12) United States Patent
Susaki

(10) Patent No.: US 7,583,864 B2
(45) Date of Patent: Sep. 1, 2009

(54) IMAGE READER

(75) Inventor: Yoichi Susaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1064 days.

(21) Appl. No.: 11/092,665

(22) Filed: Mar. 30, 2005

(65) Prior Publication Data

US 2005/0219646 A1 Oct. 6, 2005

(30) Foreign Application Priority Data

Mar. 31, 2004 (JP) ............................ 2004-105612

(51) Int. Cl.
*G06K 9/20* (2006.01)
*G06K 9/00* (2006.01)
*H04N 1/04* (2006.01)

(52) U.S. Cl. ...................... 382/312; 382/318; 358/497; 358/486; 358/474

(58) Field of Classification Search .................. 358/1.6, 358/1.5, 504, 400, 486, 474, 497; 250/559.32; 399/209, 211, 396; 400/283, 284, 285.5, 400/286, 319, 320
See application file for complete search history.

(56) References Cited

U.S. PATENT DOCUMENTS 6,765,700 B1 7/2004 Naito et al.

2002/0114656 A1* 8/2002 Ford ............................ 400/582
2005/0133992 A1* 6/2005 Ueng et al. ................. 271/902
2007/0243003 A1* 10/2007 Kinoshita et al. ........... 400/595

FOREIGN PATENT DOCUMENTS

| JP | 357039667 | * | 3/1982 |
| JP | A-63-204870 | | 8/1988 |
| JP | A 11-164066 | | 6/1999 |
| JP | A-2000-113163 | | 4/2000 |
| JP | A 2001-358878 | | 12/2001 |
| JP | A-2002-90913 | | 3/2002 |
| JP | A 2002-354165 | | 12/2002 |
| JP | A 2003-75933 | | 3/2003 |
| JP | A 2003-075933 | | 3/2003 |
| JP | A-2003-324583 | | 11/2003 |

* cited by examiner

*Primary Examiner*—Jerome Grant, II
(74) *Attorney, Agent, or Firm*—Oliff & Berridge, PLC

(57) ABSTRACT

An image reader includes an image reading device, which is capable of reading a document, an initialization operation control device, which performs an initialization operation before a reading operation starts, in order to return the image reading device to a standby position where the image reading device needs to be located until the reading operation starts, an storage device that stores flag data representing whether the initialization operation needs to be performed, and a flag data control device that controls the flag data. When the flag data represents necessity of execution of the initialization operation, the initialization operation control device performs the initialization operation. When the flag data represents nonnecessity of the execution of the initialization operation, the initialization operation control device does not perform the initialization operation.

20 Claims, 9 Drawing Sheets

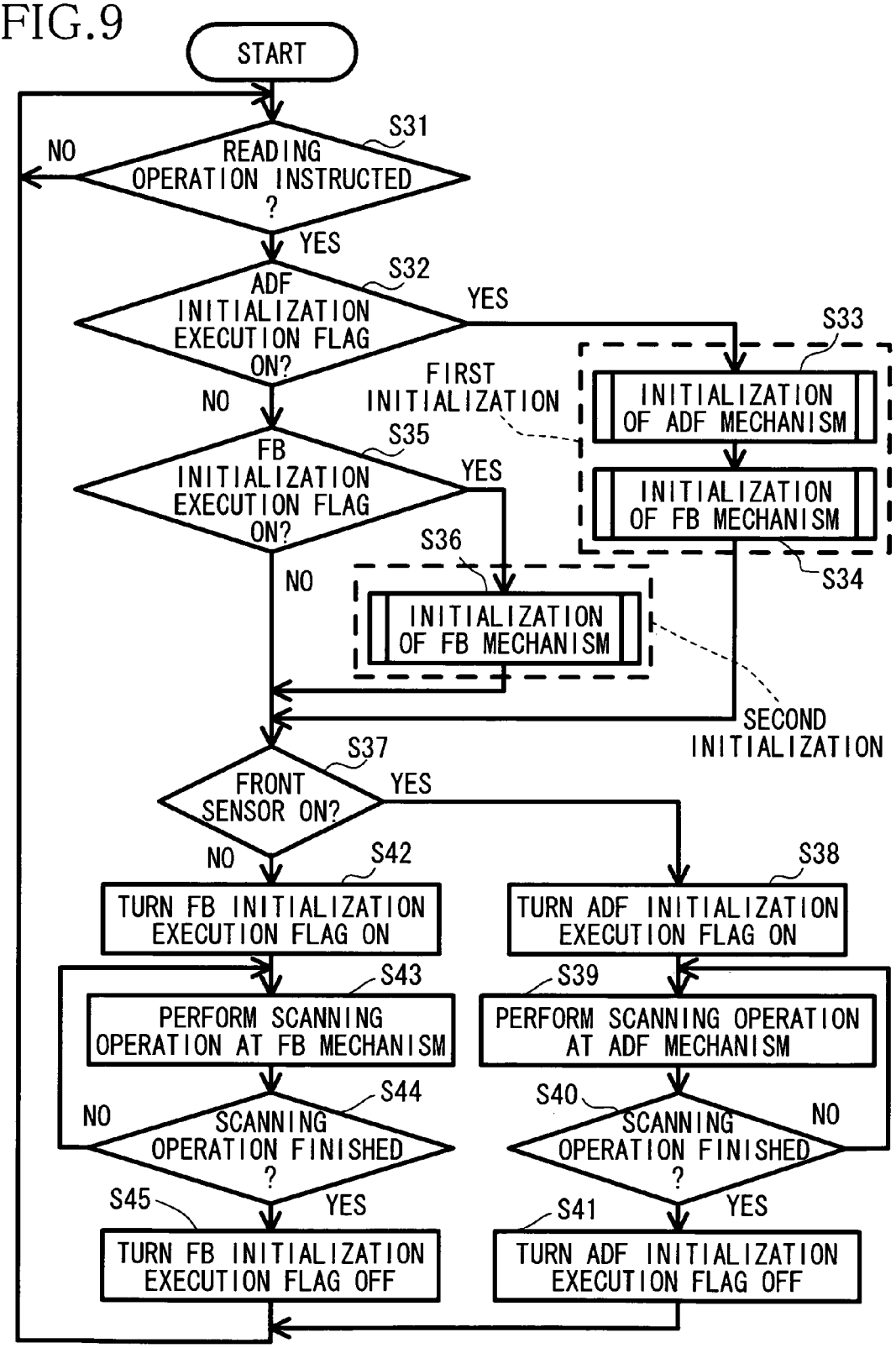

IMAGE READER

CROSS-REFERENCE TO RELATED APPLICATION

This application claims priority from Japanese Patent Application No. 2004-105612, filed Mar. 31, 2004, the subject matter of which is incorporated herein in its entirety by reference thereto.

BACKGROUND

The disclosure relates to an image reader that reads an image from a document, and more particularly, pertains to an image reader in which a predetermined initialization operation can be omitted.

An image reader is commonly provided on, for example, a copying machine, a facsimile machine, and an a multifunctional machine. Conventionally, the image reader includes a read head that reads a document, and performs a predetermined initialization operation before performing an operation of reading an image from a document. In some cases, however, the read head may be in a standby status at a position that is displaced from a normal standby position because some problem or error occurred at a previous reading operation. If the reading operation is performed with nothing done with the displacement of the read head, the read head may read an image from a document at a position that is displaced from an appropriate image read position. The displacement of the read head may cause displacements or slur of a read image. To avoid such problems, the initialization operation is conventionally performed to return the read head to a read reference position before a next reading operation is started.

When the above-described initialization operation is performed before a reading operation is performed, however, a waiting time occurs until the reading operation starts. If the initialization operation is performed every time the execution of a reading operation is instructed, a total processing time will be extended. In addition, some other problems may arise. For example, power consumption in the image reader may increase and performance of members arranged in the image reader may be reduced. To resolve such problems, there has been known various techniques of omitting the predetermined initialization operation in order to reduce the processing time and the power consumption.

For example, Japanese Laid-Open Patent Publication No. 2003-75933 discloses an image forming apparatus including a document read portion, wherein the document read portion is capable of sliding with respect to a body of the image forming apparatus. The image forming apparatus further includes a home position (HP) sensor and a contact image sensor (CIS), which reads a document. The HP sensor is used to detect the CIS for positioning the CIS at a read starting position. When the HP sensor is on, the CIS is located at the read starting position. In this case, an initialization operation for returning the CIS to the read starting position is omitted even immediately after power of the image forming apparatus is turned on.

SUMMARY

There may be cases where an abnormal termination, which a currently-executed reading operation is interrupted while the image reader is still in operation, occurs because of an occurrence of power-down or an error. In this case, if the reading operation is restarted without an initialization operation performed in the image reader, a next reading operation starts while the image reader is in the termination state. This action may cause detrimental effects on a read image and the image reader. Therefore, conventionally, regardless of whether a previous reading operation is properly finished (e.g. the previous reading operation is finished without any problem or error), the initialization operation is executed every time before a reading operation is performed. By doing so, executing the reading operation while the image reader is in the abnormal condition can be avoided. As described above, however, the conventional image reader cannot determine whether the previous reading operation is interrupted due to an occurrence of an abnormal condition. Thus, the initialization operation cannot be omitted before the reading operation is performed.

Japanese Laid-Open Patent Publication No. 2003-75933 discloses that the initialization operation will be omitted when the CIS locates at the read starting position as a result of the detection of the CIS by the HP sensor. In the image forming apparatus, the determination of whether the initialization operation should be performed is made according to the detected position of the CIS. When the CIS does not locate at the read starting position, however, the cause of the displacement of the CIS cannot be identified whether the CIS is displaced due to the abnormal termination (the interruption) during the reading operation or the sliding of the document read portion.

The conventional image reader may include both a flatbed (FB) mechanism and an automatic document feeding (ADF) mechanism. In the flatbed mechanism, a document placed on a glass plate is read by the read head. In the automatic document feeding mechanism, a document which is being conveyed by a document conveying device is read by the read head. In this image reader, the initialization operation needs to be performed in both of the flatbed mechanism and the automatic document feeding mechanism when an abnormal termination occurs during the reading operation. However, the conventional image reader cannot determine whether the abnormal termination occurs, resulting in the initialization operation being performed in both of the flatbed mechanism and the automatic document feeding mechanism every time a reading operation is performed. Thus, the total processing time is extended.

The disclosure, thus provides, among other things, an image reader in which an initialization operation is omitted at a reading operation when a previous reading operation is properly finished while the initialization operation is surely performed when an interruption occurs during the previous reading operation, thereby shortening a processing time and reducing power consumption while maintaining accuracy of reading operations.

According to one exemplary aspect of the disclosure, an image reader includes an image reading device that is capable of reading a document; an initialization operation control device that performs an initialization operation before a reading operation starts, in order to return the image reading device to a standby position where the image reading device needs to be located until the reading operation starts; a storage device that stores flag data representing whether the initialization operation needs to be performed; and a flag data control device that controls the flag data. The flag data represents the necessity of execution of the initialization operation while the reading operation is performed by the image reading device. The flag data represents the nonnecessity of the execution of the initialization operation after the reading operation by the image reading device is finished. When the flag data represents the necessity of the execution of the initialization operation, the initialization operation control device performs the initialization operation. When the flag data represents the nonnecessity of the execution of the initialization operation, the initialization operation control device does not perform the initialization operation.

In the image reader according to one exemplary aspect of the disclosure, the flag data representing whether the initialization operation needs to be performed is provided in the storage device. While the reading operation is performed, the flag data is controlled to represent the necessity of the execution of the initialization operation. After the reading operation is finished, the flag data is controlled to represent the nonnecessity of the execution of the initialization operation. When the flag data represents the necessary of the execution of the initialization operation, the initialization operation is performed before the next reading operation starts. Accordingly, while the initialization operation is omitted when the previous reading operation is properly finished, the initialization operation is surely performed before the reading operation starts if the previous reading operation is interrupted in the middle of the operation. With this control, the processing time can be shortened and the power consumption can be reduced while the accuracy of reading operations is ensured.

BRIEF DESCRIPTION OF THE DRAWINGS

Exemplary embodiments will be described in detail with reference to the following figures wherein:

FIG. 9 is a main flowchart of a reading control process according to a second exemplary embodiment.

DETAILED DESCRIPTION OF EMBODIMENTS

Exemplary embodiments will be described with reference to the accompanying drawings. A multifunctional machine 1 of a first exemplary embodiment in which an image reader is embodied, will be described below. The image reader of the exemplary embodiment is built into the multifunctional machine 1 that has functions of an image scanner, a printer, a copying machine, and a facsimile machine.

Figure 1:
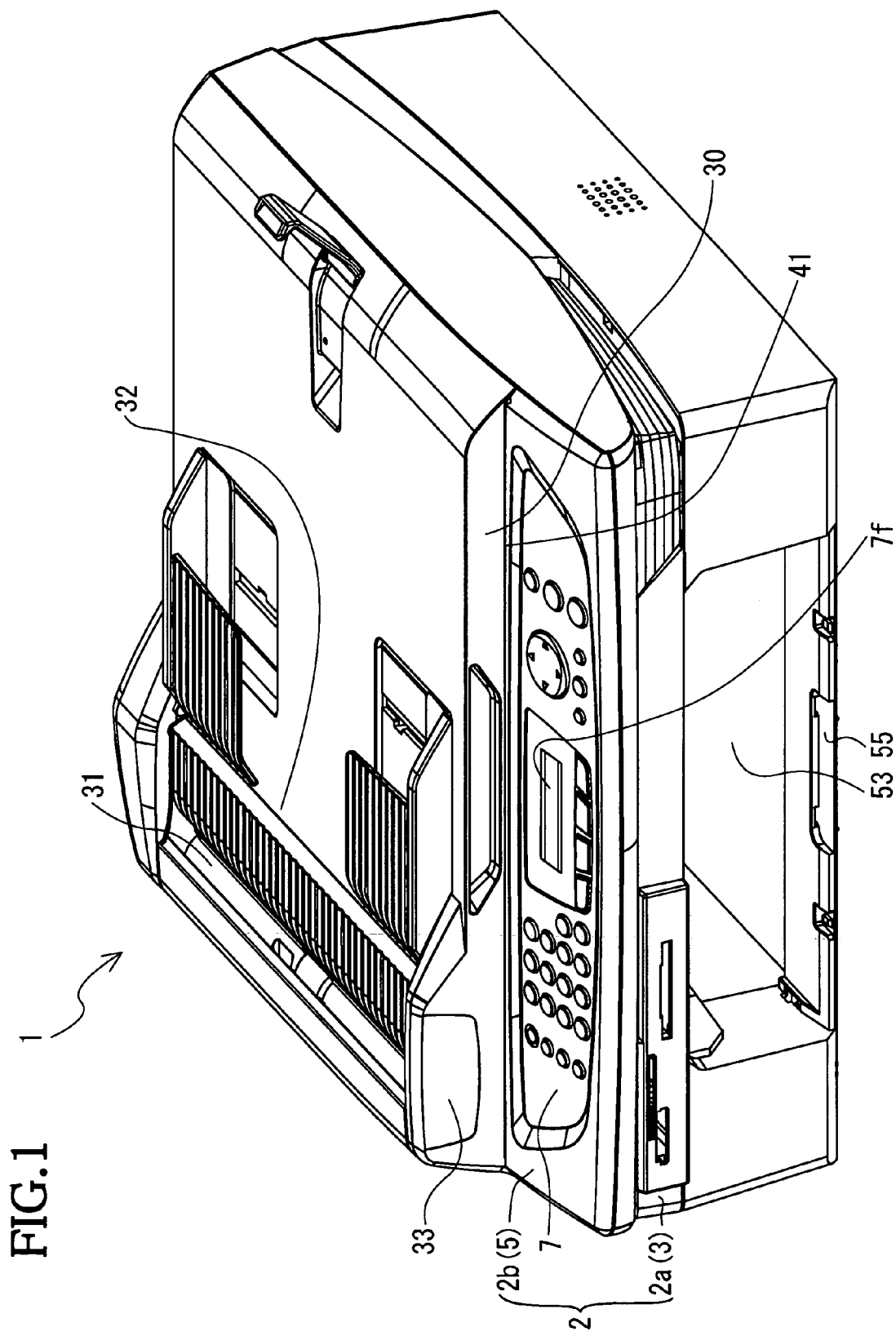
FIG. 1 is a perspective view illustrating an appearance of a multifunctional machine.

As shown in FIG. 1, the multifunctional machine 1 includes a body 2 having a clamshell structure. The body 2 includes a lower body 2a and an upper body 2b. The upper body 2b is attached to the lower body 2a so as to be openable and closable with respect to the lower body 2a. The multifunctional machine 1 includes an image forming device 3 (as an ink-jet printer) and an image reader 5. The image forming device 3 and the image reader 5 are built into the lower body 2a and the upper body 2b, respectively. The orientation of the multifunctional machine 1 is defined such that a near side of FIG. 1 is referred to as the front, a far side of FIG. 1 is referred to as the rear, a right side of FIG. 1 is referred to as the right and a left side of FIG. 1 is referred to as the left. The upper body 2b is provided, at its front, with a control panel 7 that is to be used for setting or instructing various operating modes of the facsimile function, the scanning function, and the copying function. The operating modes refer to various conditions including operation details regarding the above functions and system requirements.

The image reader 5 built into the upper body 2b of the multifunctional machine 1 includes a flatbed (FB) mechanism, in which an image is read from a document placed on a platen glass 41, and an automatic document feeding (ADF) mechanism, in which an image is read from a document that travels from a document insertion port 32 to a document discharge port 31. The platen glass 41 is a rectangular glass plate that is provided in a horizontal position inside the upper body 2b. In the flatbed mechanism, a document is placed on the platen glass 41, and a read head 50 (FIG. 3), which is provided under the platen glass 41, scans the document to read an image from the document. The automatic document feeding mechanism includes an automatic document feeder 33. In the automatic document feeding mechanism, the document discharge port 31 and the document insertion port 32 are provided at the upper body 2b. A document is inserted into the document insertion port 32 and is then conveyed to the document discharge port 31, through a predetermined read position of the read head 50, by the automatic document feeder 33, so that an image is read from the document. The image reader 5 also includes a body having a clamshell structure. The body includes a cover portion 30. The cover portion 30 is attached to the body so as to be able to cover and uncover an upper surface of the platen glass 40. The cover portion 30 of the image reader 5 functions as a document holder by covering the upper surface of the platen glass 41 to hold therebetween a document placed on the platen glass 41.

The image forming device 3 built into the lower body 2a of the multifunctional machine 1 takes a sheet-like recording medium (as a recording sheet) therein from a sheet tray (not shown) and forms an image onto a recording surface of the recording sheet by an ink-jet printing system. The sheet tray is provided on the rear side of the multifunctional machine 1. The recording sheet on which the image was printed is then discharged from a sheet discharge port 53, which is provided on the front side of the multifunctional machine 1. A pullout sheet discharge tray 55 is provided below the sheet discharge port 53. The sheet discharge tray 55 can be pulled out to receive a recording sheet discharged from the sheet discharge port 53, as necessary.

The control panel 7 includes various buttons and switches and a liquid crystal panel 7f. The buttons and switches include a ten key for inputting numeric values, a cursor key for selecting directions in cross directions, and a menu/set button for displaying an initial menu screen when the multifunctional machine 1 is in a default state and for determining operating modes. The liquid crystal panel 7f displays menu screens showing various menu items, contents inputted by a user, and errors. The user can specify the operating modes by using these buttons and switches. In addition, the user can set an operating mode and display other menu screens by selecting menu items from the menu screen displayed on the liquid crystal panel 7f.

Figure 2:
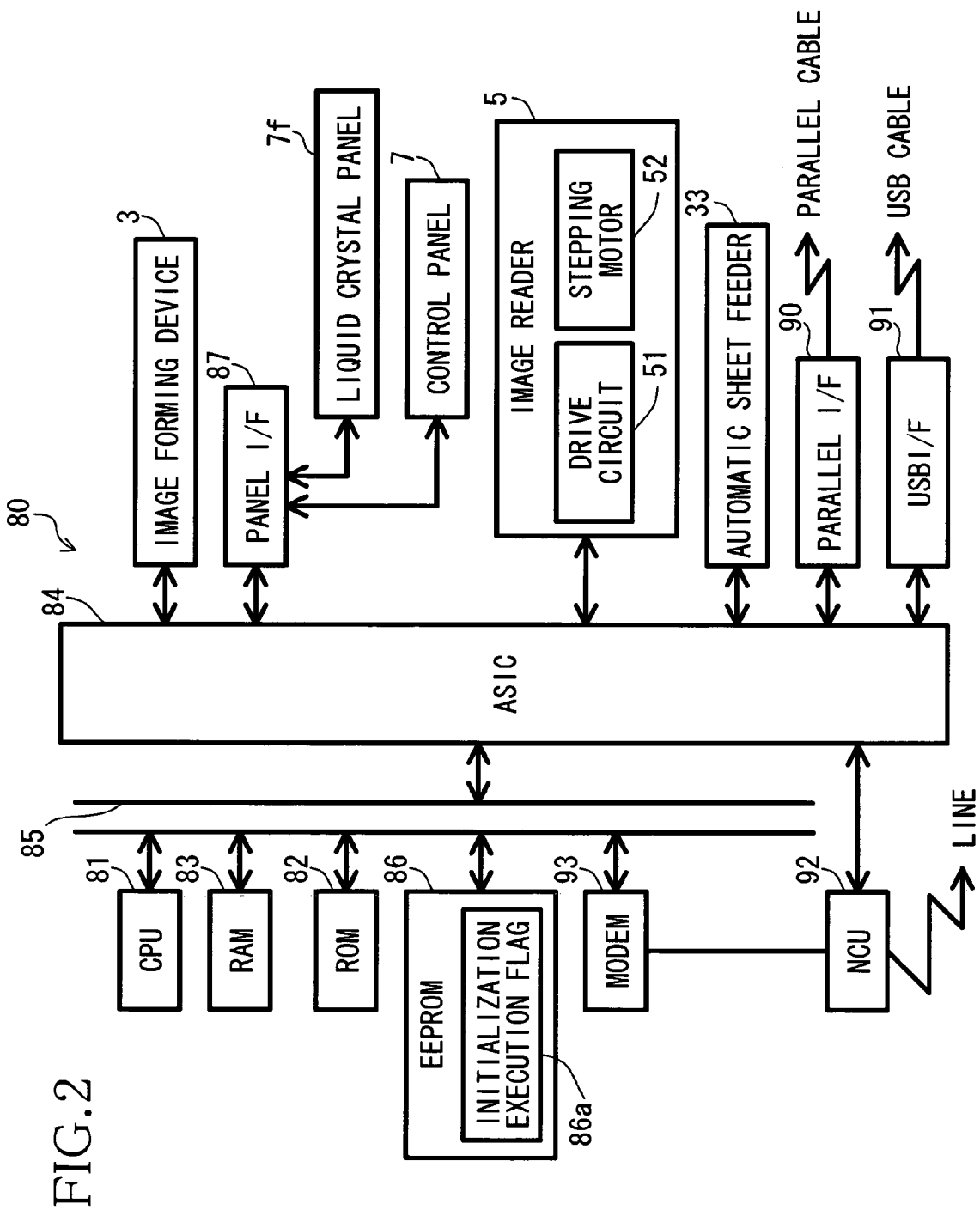
FIG. 2 is a block diagram representing an electrical configuration of a controller.

As shown in FIG. 2, the multifunctional machine 1 includes a controller 80, which controls various operations performed in the multifunctional machine 1. The controller 80 includes a microcomputer, as a control portion, including a CPU 81, a ROM 82, and a RAM 83, and an ASIC (Application Specific Integrated Circuit) 84. The controller 80 controls all operations to be performed in the multifunctional machine 1 as well as operations to be performed in the image reader 5 and the image forming device 3.

The controller 80 includes the CPU 81, the ROM 82, the RAM 83, an EEPROM 86, and the ASIC 84, which are connected with each other via a bus 85. The CPU 81 performs various operations and controls. The ROM 82 stores programs such as BIOS that is required for the controls to be executed by the CPU 81. The RAM 83 has multiple storage areas to temporarily store data therein. The EEPROM 86 is a rewritable nonvolatile memory that stores various set values of the multifunctional machine 1 and various flags for controlling the operations. In this embodiment, an initialization execution flag 86a is provided in the EEPROM 86. The initialization execution flag 86a represents the necessity and nonnecessity of the execution of a predetermined initialization operation before a reading operation is performed, by "on" and "off", respectively. The ROM 82 stores a flag data control program and an initialization operation control program. The flag data control program controls the initialization execution flag 86a to be "on" while a reading operation is being performed. In addition, the flag data control program controls the initialization execution flag 86a to be "off" after the reading operation is finished. The initialization operation control program executes a predetermined initialization operation before a reading operation is performed when the initialization execution flag 86a is "on".

The ASIC 84 is connected with the image forming apparatus 3, a panel interface (I/F) 87 for the control panel 7 and the liquid crystal panel 7f, a drive motor 51 for a stepping motor 52 for moving the read head 50, the automatic document feeder 33, a parallel interface (I/F) 90, a USB interface (I/F) 91, a network control unit (NCU) 92, and a modem 93. The parallel interface 90 is provided to perform input and output of image data with an external personal computer (PC) (not shown) therebetween. The USB interface 91 is provided to perform input and output of image data with an external device, such as a digital camera, therebetween. The network control unit 92 conveys data between an external facsimile machine via a public line. In some embodiments, an external PC may be connected to the multifunctional machine 1 via the USB interface 91.

Figure 3:
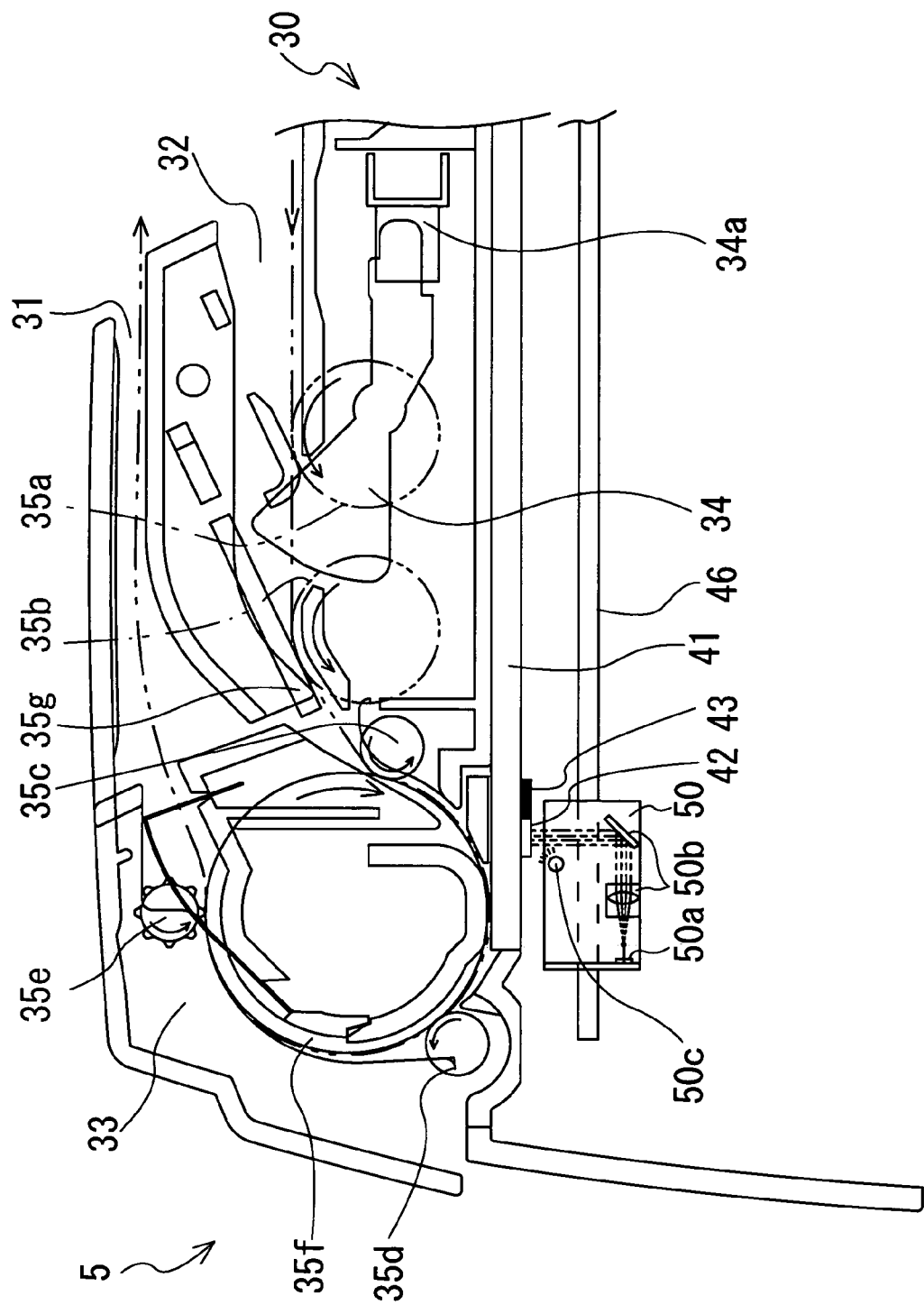
FIG. 3 is a vertical sectional view of an image reader including a front sensor when viewed from the front.

As shown in FIG. 3, in the image reader 5, the cover portion 30 includes the document discharge port 31 from which a document is discharged, the document insertion port 32 into which a document is inserted, and the automatic document feeder 33 which conveys a document inserted from the document insertion port 32 to discharge the document from the document discharge port 31. The automatic document feeder 33 includes a front sensor 34 and a plurality of conveyor rollers 35a, 35b, 35c, 35d, 35e, 35f. The front sensor 34 detects a document that is inserted from the document insertion port 32. The conveyor rollers 35a to 35f rotate to convey a document. The conveyor rollers 35a to 35f are driven by power supplied by driving of an ADF motor (not shown). In this exemplary embodiment, the ADF motor is provided as a stepping motor. The conveyor roller 35b functions as a so-called pick-up roller, which separates (picks up) a lowermost sheet of a stack of documents placed at the document insertion port 32 from the stack of documents and conveys the separated document to the conveyor roller 35c, in cooperation with a frictional separation member 35g. The frictional separation member 35g is disposed so as to be in contact with a peripheral surface of the conveyor roller 35b when the document do not exist therebetween.

The front sensor 34 is a rotatable member having a substantially sector-shaped section. The front sensor 34 is disposed such that one end extends to a document conveying path and the other end is movably engaged with a photocoupler 34a. The photocoupler 34a is a sensor that integrally includes a light emitting portion and a photoreceptor portion and detects a light interception member that is positioned between the light emitting portion and the photoreceptor portion. The other end of the front sensor 34 functions as the light interception member. Usually, the light that is emitted from the light emitting portion to the photoreceptor portion is intercepted by the other end of the front sensor 34, so that the photocoupler 34a is off. When a document is inserted into the document insertion port 32, the document placed on the document conveying path contacts the one end of the front sensor 34, so that the front sensor 34 rotates in a counterclockwise direction in FIG. 3. As the front sensor 34 rotates, the other end of the front sensor 34 moves (e.g. upward) from a position, so that the light travels from the light emitting portion to the photoreceptor portion in the photocoupler 34. Thus, the photoreceptor portion receives the light from the light emitting portion and the photocoupler 34 is turned on.

Figure 4:
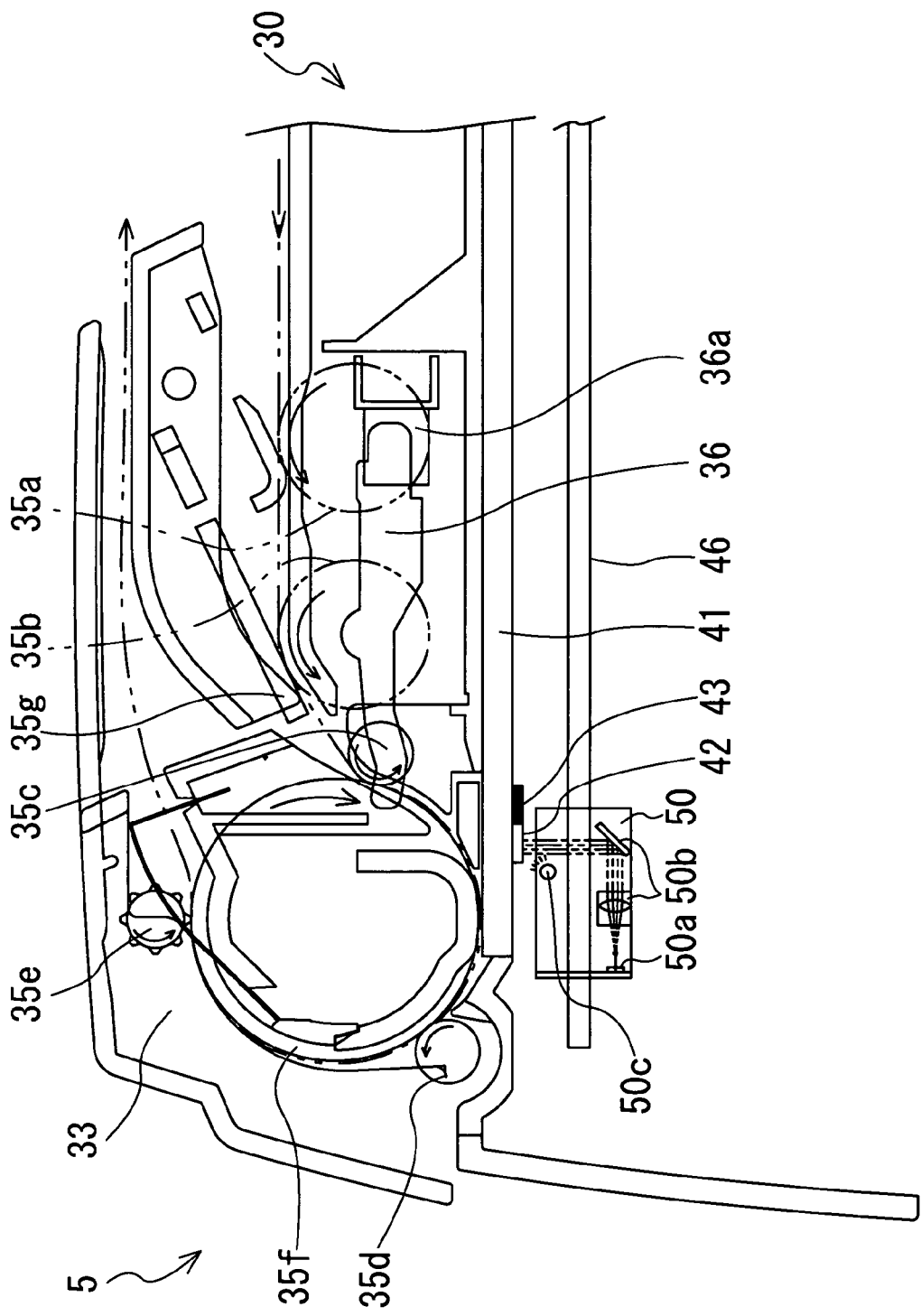
FIG. 4 is a vertical sectional view of the image reader including a rear sensor when viewed from the front.

Likewise, as shown in FIG. 4, the image reader 5 includes a rear sensor 36 that detects a document being conveyed, inside the automatic document feeder 33. The rear sensor 36 is a rotatable member having a substantially rectangular shape section. The longitudinal sides of the rear sensor 36 extend in a horizontal direction. The rear sensor 36 is disposed such that one end extends to the document conveying path and the other end is movably engaged with a photocoupler 36a. The photocoupler 36a is a sensor that integrally includes a light emitting portion and a photoreceptor portion and detects a light interception member that is positioned between the light emitting portion and the photoreceptor portion. The other end of the rear sensor 36 functions as the light interception member. Operations and functions of the rear sensor 36 are the same as those of the front sensor 34.

As described above, in the automatic document feeder 33, a document inserted from the document insertion port 32 can be detected by the front sensor 34, and a document being conveyed in the document conveying path by the conveyor rollers 35a to 35f can be detected by the rear sensor 36.

As shown in FIGS. 3 and 4, various mechanisms are provided below the platen glass 41 in order that the read head 50 reads an image from a document through the platen glass 41. A guide shaft 46, as a shaft member, is provided under the platen glass 41. An axial direction of the guide shaft 46 extends in a side-to-side direction of the multifunctional machine 1 (in the right and left direction in FIGS. 3 and 4). The guide shaft 46 extends in a direction parallel to the platen glass 41. The read head 50 is guided by the guide shaft 46. The read head 50 moves along the guide shaft 46 to scan a document placed on the platen glass 41 and reads an image from the document.

The read head 50 includes an image sensor 50a having a CCD (charged-coupled device), optical elements 50b having a number lenses and mirrors, and a light source 50c. The image sensor 50a reads an image from a document by which light is irradiated by the light source 50c onto the document, which is placed at a reading target position, and light reflected off the document is condensed by the optical elements 50b into the image sensor 50a.

A white reference member 42 and a reference position member 43 are adhered, side by side, to an undersurface of the platen glass 41 so that the read head 50 can read the white reference member 42 and the reference position member 43. The white reference member 42 is made of a white vinyl tape having uniform concentration distribution. The reference position member 43 is made of a black vinyl tape. The image reading operation performed by the read head 50 includes a binary reading (black and white) and a gray-scale reading. The read head 50 reads an image from the white reference member 42 to obtain white level correction data which is needed when measured data is converted into ideal data. The read head 50 reads an optical black (an optical black pixel: a light interception portion provided on an image pickup surface of the CCD in order that the read head 50 obtains a reference of an optical black level) to obtain black level correction data. Further, the read head 50 obtains gray-scale data by taking a halftone of the black and the white. Thus, the black and white references necessary for the image reading operation are obtained. In this exemplary embodiment, a position where the read head 50 can read the white reference member 42 is also referred to as a normal standby position 21 (FIG. 5) where the read head 50 is located before or after a reading operation is performed.

Figure 5:
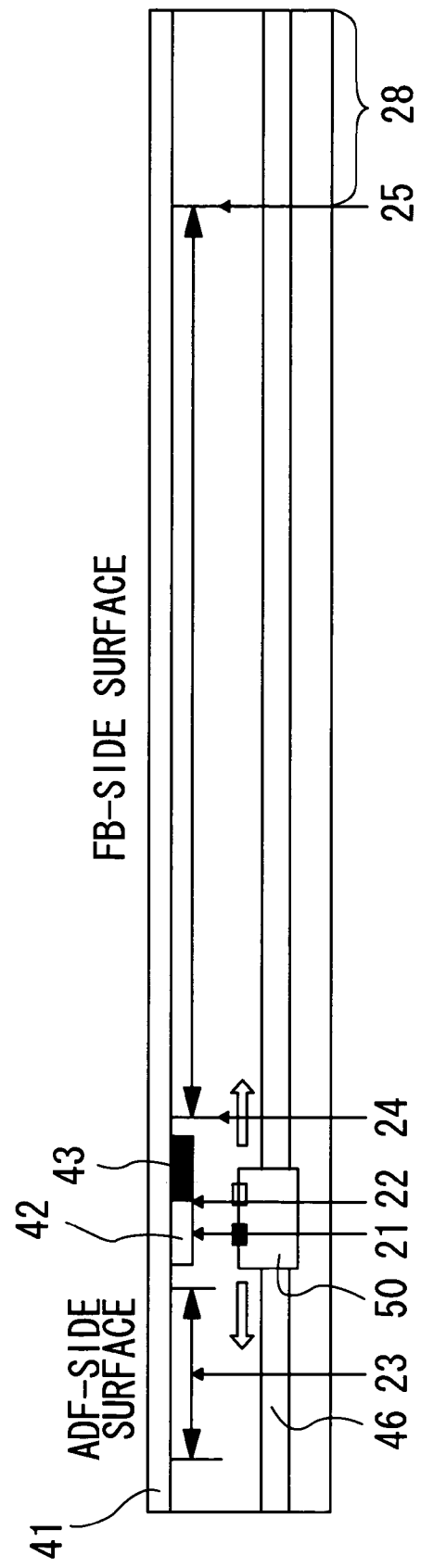
FIG. 5 is a vertical sectional view the image reader including a read head and a platen glass.

The reference position member 43 is a mark representing a read reference position which is a starting point of the read head 50 that moves. The read head 50 detects a boundary between the reference position member 43 and the white reference member 42 to determine a boundary position as a read reference position 22 (FIG. 5). All movements of the read head 50 are accomplished with reference to the read reference position 22. All positions, such as an ADF-side read position (described later) and an FB-side read starting position (described later), are obtained with reference to the read reference position 22, and the read head 50 is moved to the obtained positions.

As shown in FIG. 5, in the platen glass 41, a part that corresponds to the right part of the multifunctional machine 1 with respect to the reference position member 43 is referred to as an FB-side surface. In the FB-side surface, a reading operation is performed by the flatbed mechanism. In the platen glass 41, a part that corresponds to the left part of the multifunctional machine 1 with respect to the reference position member 43 is referred to as an ADF-side surface. In the ADF-side surface, a reading operation is performed by the automatic document feeding mechanism.

A reading operation to be performed in the multifunctional machine 1 of the first exemplary embodiment will be described with reference to FIG. 5.

First, a reading operation to be performed by the flatbed mechanism will be described. The user places a document onto the FB-side surface of the platen glass 41 and closes the cover portion 30 to press the document against the FB-side surface. Under this condition, the user performs a predetermined operation by using the control panel 7 (for example, the user presses a reading start button). Then, the read head 50 that is in a standby status at the normal standby position 21 reads the white reference member 42 to obtain the reference of gray-scale.

After that, the read head 50 moves toward the right part of the multifunctional machine 1 (in the right direction in FIG. 5). More specifically, the read head 50 moves rightward in accordance with distance data, which represents a distance between the normal standby position 21 and the read reference position 22 and a distance between the read reference position 22 and an FB-side read starting position 24, until the read head 50 reaches the FB-side read starting position 24. The distance data is stored in the EEPROM 86, and will be described later in detail. In accordance with the start of the movement of the read head 50, the initialization execution flag 86*a* stored in the EEPROM 86 is turned "on". That is, the "on" is written into the flag date. On the FB-side surface of the platen glass 41, the FB-side read starting position 24 is a nearest readable position from the normal standby position 21 and an FB-side read end position 25 is a furthest readable position from the normal standby position 21. When the read head 50 reaches the FB-side read starting position 24, the read head 50 starts scanning an image from the document and further moves to the FB-side read end position 25 while being in an image reading status. That is, an image is read from the document by the read head 50 that moves along the FB-side surface to scan the document between the FB-side read starting position 24 and the FB-side read end position 25.

When the image scanning is finished, the read head 50 then moves toward the left part of the multifunctional machine 1 (in the left direction in FIG. 5) to detect the reference position member 43. When the read head 50 detects the reference position member 43, distance data, which represents a distance from the read reference position 22 to the normal standby position 21, is obtained at the read reference position 22, which is the boundary position between the white reference member 42 and the reference position member 43. Based on the obtained distance data, the read head 50 moves to the normal standby position 21 and enters the standby status at the position. When the read head 50 reaches the normal standby position 21, the initialization execution flag 86*a* stored in the EEPROM 86 is turned "off". That is, the "off" is written into the flag data. Alternatively, the initialization execution flag 86*a* may be turned "off" before the read head 50 reaches the normal standby position 21 while moving toward the normal standby position 21, that is, between the instance when the scanning of the image is finished and the instance when the read head 50 reaches the normal standby position 21, on the supposition that the read head 50 goes back to the normal standby position 21.

Next, a reading operation to be performed by the automatic document feeding mechanism will be described below. First, the user places documents at the document insertion port 32. Under this condition, the user performs predetermined operations by using the control panel 7 (for example, the user presses the reading start button). Then, in a similar manner to the reading operation performed by the flatbed mechanism, the read head 50 that is in the standby status at the normal standby position 21 reads the white reference member 42 to obtain the reference of gray-scale. Then, the read head 50 moves toward the left part of the multifunctional machine 1 (in the left direction in FIG. 5). More specifically, the read head 50 moves leftward in accordance with distance data, which represents a distance between the normal standby position 21 and the read reference position 22 and a distance between the read reference position 22 and an ADF-side read starting position 23, until the read head 50 reaches the ADF-side read starting position 23. The above distance data is also stored in the EEPROM 86. That is, the read head 50 moves in the left direction based on a distance which is obtained by subtracting the former distance data (which represents the distance between the normal standby position 21 and the read reference position 22) from the latter distance data (which represents the distance between the read reference position 22 and the ADF-side read starting position 23), and the read head 50 stops at the ADF-side read starting position 23. In accordance with the start of the movement of the read head 50, the initialization execution flag 86*a* stored in the EEPROM 86 is turned "on".

The ADF-side read position 23 refers to a position where the read head 50 can read a document, which is placed on the ADF-side surface of the platen glass 41, through the platen glass 41. As the read head 50 reaches the ADF-side read position 23, the automatic document feeder 33 starts conveying the documents, one by one. While the document passes the ADF-side surface of the platen glass 41, an image of the document is read by the read head 50 that is located at the ADF-side read position 23. A lowermost document is separated from the plurality of documents inserted into the document insertion port 32, and is conveyed one by one. When the scanning of images from all of the documents is finished, the read head 50 moves toward the right part of the multifunctional machine 1 to detect the reference position member 43. When the read head 50 detects the reference position member 43, distance data, which represents a distance from the read reference position 22 to the normal standby position 21, is obtained at the read reference position 22, which is the boundary position between the white reference member 42 and the reference position member 43. Thus, the read head 50 moves to the normal standby position 21 and enters the standby status at the position. When the read head 50 reaches the normal standby position 21, the initialization execution flag 86a stored in the EEPROM 86 is turned "off". That is, the "off" is written into the flag data. Alternatively, the initialization execution flag 86a may be turned "off" before the read head 50 reaches the normal standby position 21 while moving toward the normal standby position 21, that is, between the instance when the scanning of the image is finished and the instance when the read head 50 reaches the normal standby position 21, on the supposition that the read head 50 goes back to the normal standby position 21.

As described above, while the reading operation is being performed by the flatbed mechanism or the ADF mechanism, the initialization execution flag 86a is kept "on". When the reading operation is properly completed, the initialization execution flag 86a is turned "off".

Figure 6:
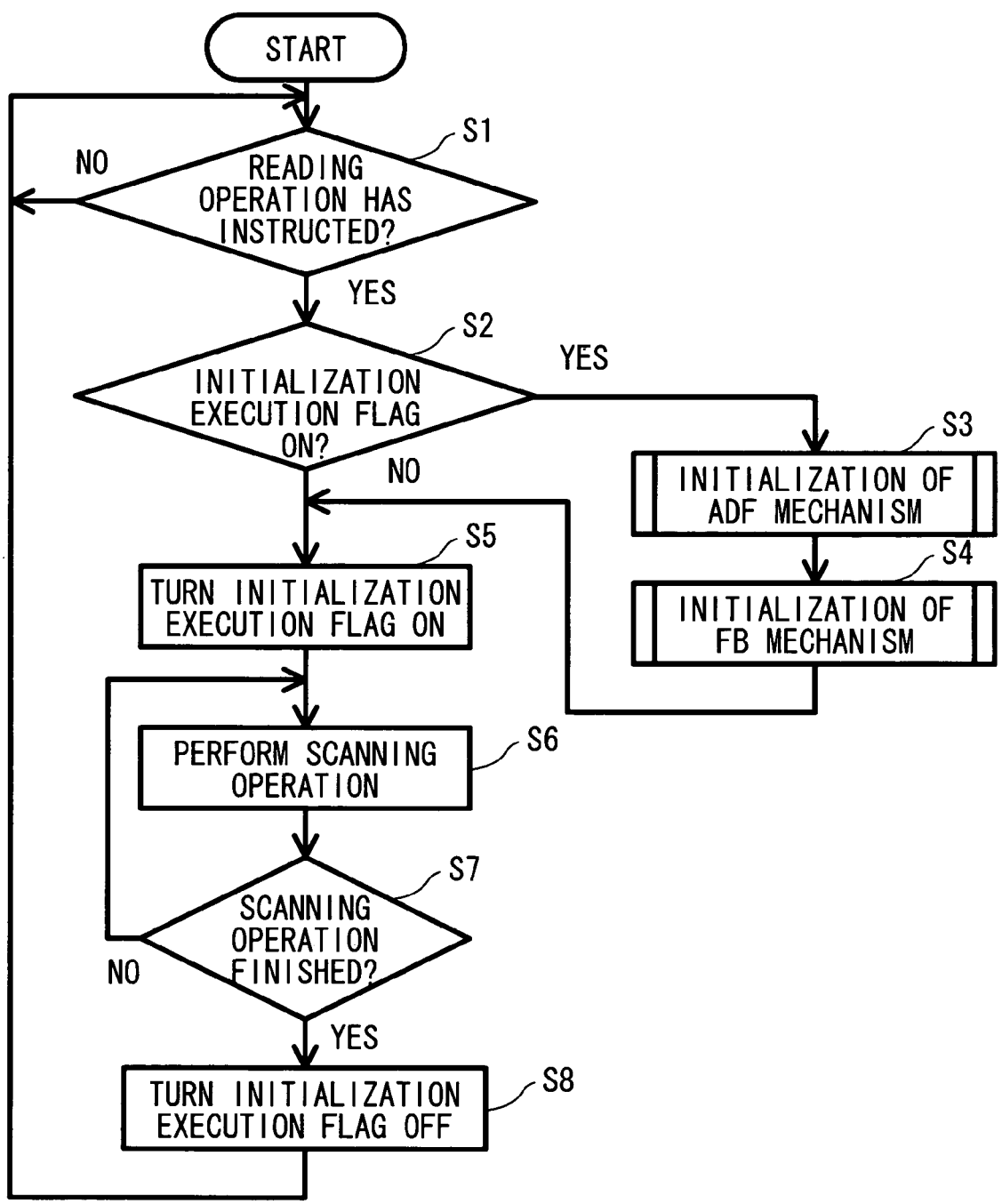
FIG. 6 is a main flowchart of a reading control process according to a first exemplary embodiment.
Figure 7:
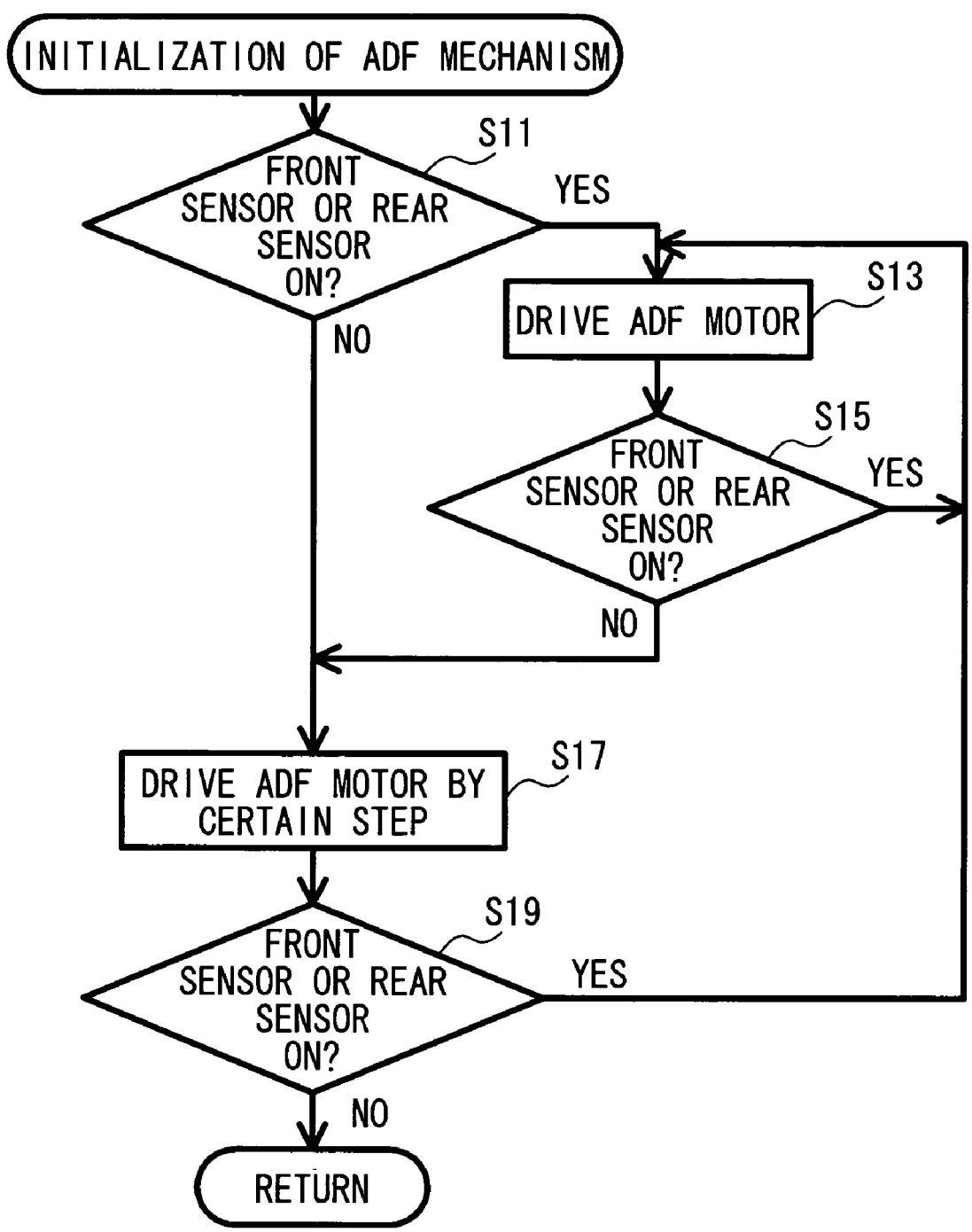
FIG. 7 is a flowchart of initialization of an automatic document feeding mechanism.
Figure 8:
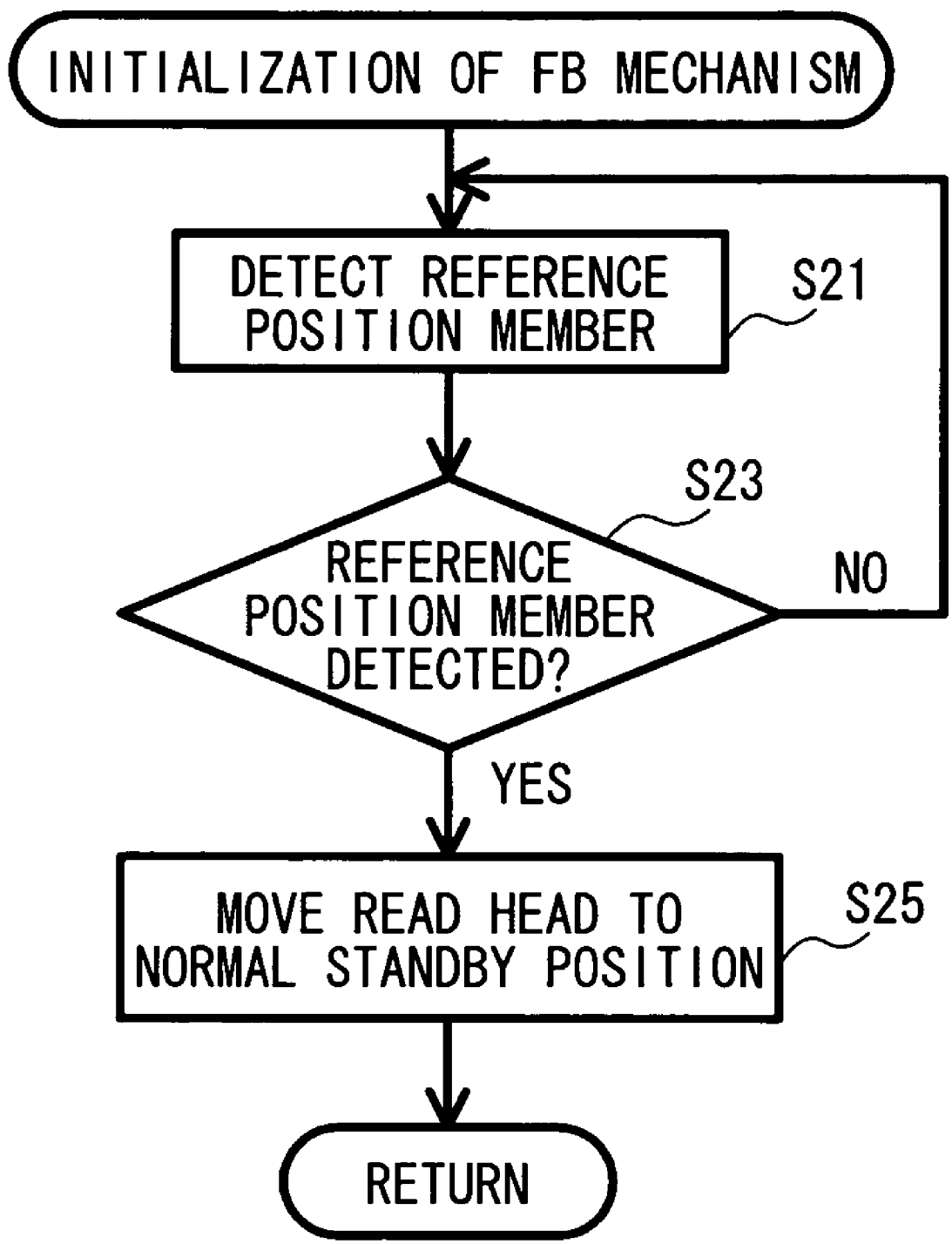
FIG. 8 is a flowchart of initialization of a flatbed mechanism.

Next, a reading control process including the above-described reading operations and the predetermined initialization operation performed in the multifunctional machine 1 will be described with reference to FIGS. 6 to 8. FIG. 6 is a main flowchart of the reading control process. FIG. 7 is a detailed flowchart of initialization of the automatic document feeding mechanism (S3 of FIG. 6). FIG. 8 is a detailed flowchart of initialization of the flatbed mechanism (S4 of FIG. 6).

As shown in FIG. 6, at the reading control process, first, it is determined whether a reading operation has been instructed (S1). That is, it is determined whether the user has instructed the execution of a reading operation. The instruction of the execution of a reading operation is issued, as described above, by which the user performs the predetermined operation by using the control panel 7 (for example, the user presses the reading start button) after placing the document(s) on the FB-side surface of the platen glass 41 or at the document insertion port 32. When a reading operation has not been instructed (S1:NO), flow waits at S1.

When a reading operation has been instructed (S1:YES), it is determined whether the initialization execution flag 86a stored in the EEPROM 86 is "on" (S2). As described above, the initialization execution flag 86a is controlled to "on" or "off" according to a condition of a previous reading operation. When the initialization execution flag 86a is "on" (S2:YES), the initialization of the automatic document feeding mechanism (S3) and the flatbed mechanism (S4) are then performed.

As shown in FIG. 7, at the initialization of the automatic document feeding mechanism (S3), first, it is determined whether at least one of the front sensor 34 and the rear sensor 36 is on (S11). When at least one of the front sensor 34 and the rear sensor 36 is on (S11:YES), the ADF motor that supplies the power to the conveyor rollers 35a to 35f is driven (S13). At S13, the ADF motor is driven by a step to the extent that at least a document is conveyed from the document insertion port 32 to the document discharge port 31 and is completely discharged from the document discharging port 31. By doing so, the document that remains in an area where the front sensor 34 or the rear sensor 36 can detect the existence of the document is completely discharged out of the automatic document feeder 33. As a matter of course, the document placed at the document insertion port 32 is also completely discharged out of the automatic document feeder 33. After that, it is determined again at least one of the front sensor 34 and the rear sensor 36 is on (S15). When at least one of the front sensor 34 and the rear sensor 36 is on (S15:YES), there is a document remaining in the automatic document feeder 33 or there is a document placed at the document insertion port 32, so that flow goes back to S13 to drive the ADF motor again to discharge the document out of the automatic document feeder 33.

At S11 and S15, when both of the front sensor 34 and the rear sensor 36 are off (S11:NO, S15:NO), the ADF motor is driven by a certain step (S17). In the multifunctional machine 1 according to one aspect of the exemplary embodiment, there is no sensor provided to detect a document that exists between the rear sensor 36 and the document discharge port 31 in the document conveying path. Therefore, if a document remains somewhere between the rear sensor 36 and the document discharge port 31 in the document conveying path, both of the front sensor 34 and the rear sensor 36 are off, so that the document remaining in the automatic document feeder 33 may not be able to be effectively detected. Accordingly, at S17, the ADF motor is driven by the certain step to the extent that at least a document is conveyed from the rear sensor 36 to the document discharge port 31 so as to be completely discharged from the document discharging port 34. By doing so, even when a document remains in the area where the front sensor 34 and the rear sensor 36 cannot detect the existence of the document, the document is completely discharged out of the automatic document feeder 33.

At last, it is determined whether at least one of the front sensor 34 and the rear sensor 36 is on (S19). When at least one of the front sensor 34 and the rear sensor 36 is on (S19:YES), flow goes back to S13 to drive the ADF motor again. When both of the front sensor 34 and the rear sensor 36 are off (S19:NO), the flow goes back to the main flow of FIG. 6. As described above, a document that remains in the automatic document feeder 33 is completely discharged from the automatic document feeder 33 through the initialization of the automatic document feeding mechanism.

Next, as shown in FIG. 8, at the initialization of the flatbed mechanism (S4), first, detection of the reference position member 43 is performed (S21). At S21, regardless of the current position of the read head 50 on the guide shaft 46, the read head 50 moves toward the right part of the multifunctional machine 1 (in the right direction in FIG. 5) by at least a distance that corresponds to the distance between the ADF-side read position 23 and the read reference position 22. After that, the read head 50 moves toward the left part of the multifunctional machine 1 (in the left direction in FIG. 5) to detect the reference position member 43 (S23).

By doing so, the read head 50 can effectively detect the reference position member 43 even when the read head 50 is located anywhere on the guide shaft 46 at the time a previous reading operation is finished. That is, the read head 50 moves in the left direction to perform scanning after moving in the right direction by at least the distance corresponding to the distance between the ADF-side read position 23 and the read reference position 22. Thus, even when the read head 50 remains at the ADF-side read position 23 because a previous reading operation is interrupted, the read head 50 can surely detect the reference position member 43. The FB-side surface includes an extra surface 28 on the right of the FB-side read end position 25 (FIG. 5). The extra surface 28 has a length that is at least the same as the distance between the ADF-side read position 23 and the read reference portion 22. Accordingly, even if the read head 50 remains at the FB-side read end position 25 because a previous reading operation is interrupted, the read head 50 can further move in the right direction by the distance corresponding to the distance between the ADF-side read position 23 and the read reference position 22. The interruption of the reading operation is caused by physical problems, for example, damage to the guide shaft 46 by corrosion or breakdown of a motor of the read head 50. With such the problems, the read head 50 may stop moving during the reading operation, so that the read head 50 cannot return to the normal standby position 21 after the reading operation is finished.

At S23, when the read head 50 detects the reference position member 43 (S23:YES), distance data, which represents a distance from the read reference position 22 to the normal standby position 21, is obtained at the read reference position 22, which is the boundary position between the white reference member 42 and the reference position member 43. Based on the obtained distance data, the read head 50 moves to the normal standby position 21 (S25) and flow goes back to the main flow of FIG. 6. When the read head 50 cannot detect the reference position member 43 (S23:NO), flow goes back to S21. Until the read head 50 detects the reference position member 43, S21 and S23 are repeatedly performed. By performing the above-described processing, the read head 50 can be surely returned to the normal standby position 21 through the initialization of the flatbed mechanism.

Referring to FIG. 6, when the initialization execution flag 86*a* is "off" (S2:NO) or when the predetermined initialization is completed (S3, S4), the initialization execution flag 86*a* is turned "on" (S5). Then, a scanning operation is performed, i.e., an image is read from the document (S6). That is, at S6, the scanning operation is performed by one of the flatbed mechanism and the automatic document feeding mechanism. The details of the scanning operation performed by each of the flatbed mechanism and the automatic document feeding mechanism is as described above. Then, at S7, it is determined whether the scanning operation is properly finished. When the scanning operation is properly finished, i.e., when the read head 50 returns to the normal standby position 21 within a certain period (S7:YES), the initialization execution flag 86*a* is turned "off" (S8). If the scanning operation is stopped or interrupted in the middle, i.e., when the read head 50 does not return to the normal standby position 21 within the certain period (S7:NO), the initialization execution flag 86*a* is not turned "off" because flow does not move to S8, so that the initialization execution flag 86*a* has remained "on" from the start of the reading operation. After S8, flow goes back to S1 and waits until a next reading operation is instructed.

When the reading operation is stopped or interrupted in the middle, i.e., when the read head 50 stops moving in the middle of the reading operation and does not return to the normal standby position 21 within the certain period, in most cases, the user turns the power of the multifunctional machine 1 off once to return the status of the multifunctional machine 1 to the normal condition. The EEPROM 86 can maintain the memory contents even when the power of the multifunctional machine 1 is turned off, so that the initialization execution flag 86*a* remains "on" if such a case happens. Therefore, information that the initialization operation needs to be performed between the instant when the power of the multifunctional machine 1 is turned on and at least the instance when a next reading operation starts, is stored.

According to one aspect of the multifunctional machine 1 of the first exemplary embodiment, when a previous reading operation is properly finished, the initialization execution flag 86*a* is turned "off", so that the predetermined initialization operation is omitted when a next reading operation is performed. When a previous reading operation is stopped or interrupted in the middle, the initialization execution flag 86*a* has remained "on" from the start of the previous reading operation, so that the predetermined initialization operation (the initialization of the automatic document feeding mechanism and the initialization of the flatbed mechanism) is performed when a next reading operation is performed. Thus, while the initialization operation can be omitted when unnecessary, the initialization operation can be surely performed at a next reading operation if a previous reading operation is stopped or interrupted in the middle. With this control, the processing time can be shortened and the power consumption of the multifunctional machine 1 can be reduced while the accuracy of the reading operations is ensured.

In addition, as the predetermined initialization operation, the initialization of both of the automatic document feeding mechanism and the flatbed mechanism is performed. Therefore, by performing the predetermined initialization operation, the documents, which are placed at the document insertion portion 32 and exist in the automatic document feeder 33, are completely discharged output the automatic document feeder 33 through the initialization of the automatic document feeding mechanism, and the read head 50 is surely returned to the normal standby position 21 through the initialization of the flatbed mechanism. Accordingly, when a reading operation is interrupted in the middle, both the initialization of the automatic document feeding mechanism and the initialization of the flatbed mechanism are surely performed. Thus, the detrimental effects on the multifunctional machine 1 can be eliminated while the accuracy of the reading operations is ensured.

Next, a multifunctional machine 1 of a second exemplary embodiment will be described with reference to FIG. 9. The multifunctional machine 1 of this exemplary embodiment basically functions and performs operations in a similar manner to the multifunctional machine 1 of the first exemplary embodiment. However, there is a difference therebetween in the following point.

In one aspect of the second exemplary embodiment, an FB initialization execution flag (not shown) and an ADF initialization execution flag (not shown) are provided as an initialization execution flag stored in the EEPROM 86. The FB initialization execution flag represents whether initialization needs to be performed in the flatbed mechanism. The ADF initialization execution flag represents whether initialization needs to be performed in the automatic document feeding mechanism. At a reading operation performed by the flatbed mechanism, the FB initialization execution flag is kept "on" during the execution of the reading operation. When the reading operation is finished, the FB initialization execution flag is turned "off". Likewise, at a reading operation performed by the automatic document reading mechanism, the ADF initialization execution flag is kept "on" during the execution of the reading operation. When the reading operation is finished, the ADF initialization execution flag is turned "off".

As described above, the initialization execution flag is provided for each of the flatbed mechanism and the automatic document feeding mechanism. Each of the respective initialization execution flags is turned "on" and "off" according to a reading operation performed by each mechanism. Under this structure, a reading control process of the second exemplary embodiment is executed as described below.

As shown in FIG. 9, first, it is determined whether a reading operation has been instructed (S31), like S1 of FIG. 6. When a reading operation has been instructed (S31:YES), it is determined whether the ADF initialization execution flag is "on" (S32). When the ADF initialization execution flag is "on" (S32:YES), first initialization is performed. The first initialization includes an initialization operation of the multifunctional machine 1 to be performed when the ADF initialization execution flag is "on".

At the first initialization, first, the initialization of the automatic document feeding mechanism is performed (S33). The details of S33 are the same as the initialization of the automatic document feeding mechanism shown in FIG. 7. There is a possibility that the read head 50 remains at the ADF-side read position 23 due to an occurrence of an interruption of a previous reading operation. Therefore, the initialization of the flatbed mechanism is performed (S34) to return the read head 50 to the normal standby position 21. The details of S34 are the same as the initialization of the flatbed mechanism shown in FIG. 8.

At S32, when the ADF initialization execution flag is "off" (S32:NO), it is determined whether the FB initialization execution flag is "on" (S35). When the FB initialization execution flag is "on" (S35:YES), second initialization is performed. The second initialization includes an initialization operation of the multifunctional machine 1 to be performed when the FB initialization execution flag is "on".

At the second initialization, the initialization of the flatbed mechanism (S36) is performed. The details of S36 are the same as the initialization of the flatbed mechanism shown in FIG. 8. When the FB initialization execution flag is "off" (S35:NO) or when the initialization of the flatbed mechanism (S34, S36) has been completed, it is determined whether the front sensor 34 is on (S37). When the front sensor 34 is on, i.e., when a scanning operation is to be performed at the automatic document feeding mechanism (S37:YES), as described above, the ADF initialization execution flag is turned on (S38) and the scanning operation is performed at the automatic document feeding mechanism (S39). Then, it is determined whether the scanning operation has been finished (S40). When the scanning operation has been finished (S40:YES), the ADF initialization execution flag is turned off (S41). When the scanning operation performed at the automatic document feeding mechanism is interrupted (S40:NO), the ADF initialization execution flag is not turned off at the last step of the reading operation. Therefore, the ADF initialization execution flag has remained "on" from the start of the reading operation.

At S37, when the front sensor is not on, i.e., when a scanning operation is to be performed at the flatbed mechanism (S37:NO), as described above, the flatbed initialization execution flag is turned on (S42) and the scanning operation is performed at the flatbed mechanism (S43). Then, it is determined whether the scanning operation has been finished (S44). When the scanning operation has been finished (S44:YES), the flatbed initialization execution flag is turned off (S45). When the scanning operation performed at the flatbed mechanism is interrupted (S44:NO), the flatbed initialization execution flag is not turned off at the last step of the reading operation. Therefore, the flatbed initialization execution flag has remained "on" from the start of the reading operation. After S41 or S45, flow goes back to S31 and waits until a next reading operation is instructed.

According to one aspect of the multifunctional machine 1 of the second exemplary embodiment, when a previous reading operation performed by the flatbed mechanism and a previous reading operation performed by the automatic document feeding mechanism are properly finished, i.e., the previous reading operations performed by those mechanisms are completed without any problems, the FB initialization execution flag and the ADF initialization execution flag are turned "off". Therefore, the predetermined initialization operations are omitted when a next reading operation is performed. When a previous operation performed by the flatbed mechanism is interrupted in the middle of the operation, the FB initialization execution flag remains "on", so that the first initialization is performed when a next reading operation is performed. When a previous operation performed by the automatic document feeding mechanism is interrupted in the middle of the operation, the ADF initialization execution flag remains "on", so that the second initialization is performed when a next reading operation is performed. Thus, the initialization operations can be omitted when unnecessary. In addition, when a reading operation is interrupted in the middle of the operation, the first or second initialization is surely performed. Therefore, the processing time can be shortened and the power consumption can be reduced while the accuracy of the reading operations is ensured.

Further, the initialization execution flag is provided by type of reading operations to be performed in the multifunctional machine 1 and the different initialization operations are executed by type of reading operations. Therefore, while an optimal initialization operation is performed in accordance with the type of a reading operation that is interrupted in the middle of the operation, the initialization operations are omitted when unnecessary. Thus, the initialization operations can be effectively performed at the time of an occurrence of an interruption of the reading operation.

Next, a multifunctional machine 1 of a third exemplary embodiment will be described below. As described above, when a reading operation is properly finished (S5 to S8), the read head 50 returns to the normal standby position 21. In fact, however, there may be cases where the read head 50 is located at a position that is displaced from the normal standby position 21, after the reading operation, due to, for example, a traveling speed of the read head 50. Thus, the multifunctional machine 1, according to one aspect of the third exemplary embodiment, further precisely controls the moving positions of the read head 50 at the reading operation (S5 to S8).

A control of the movement of the read head 50 of the third exemplary embodiment will be described below. When a reading operation is properly finished (S5 to S8), the initialization execution flag 86a stored in the EEPROM 86 is turned "off", as described above. At the same time, distance data, which represents a distance from a current standby position of the read head 50 located after the reading operation to the read reference position 22, is written in the EEPROM 86. More specifically, the distance between the read reference position 22 and the current standby position is obtained from the number of pulses of the stepping motor that was required to move the read head 50 from the read reference position 22 to the current standby position. The obtained distance data is stored in the EEPROM 86.

When the power of the multifunctional machine 1 is turned on next time and a reading operation (S5 to S8) starts, the read head 50 moves based on the distance data read from the EEPROM 86. More specifically, based on the distance data, which represents the distance from the read reference position 22 to the current standby position, and the distance data, which represents a distance from the read reference position 22 to a moving target position (the FB-side read starting position 24 or the ADF-side read position 23), the read head 50 moves from the current standby position to the moving target position. With this control, even when the current standby position of the read head 50 is displaced from the normal standby position 21 at the end of a previous reading operation, the read head 50 moves to the moving target position in consideration given to the displacement at the time of starting a next reading operation.

The distance from the read reference position 22 to the current standby position is managed by the distance data but not the number of pulses, because there are a plurality of methods of driving the stepping motor and a moving amount of the read head 50 per pulse differs according to the driving methods. If a stepping motor of a single driving type is used, the distance data stored in the EEPROM 86 can be managed by the number of pulses or the number of steps.

According to one aspect of the multifunctional machine 1 of the third exemplary embodiment, the distance data, which represents the distance between the current standby position of the read head 50 and the read reference position 22, is stored in the EEPROM 86. In the case where the initialization operations do not need to be performed when the power of the multifunctional machine 1 is on, the read head 50 moves based on the stored distance data. Consequently, the moving target position of the read head 50 can be precisely controlled even when the current standby position of the read head 50 is displaced from the normal standby position 21 at a previous reading operation.

In the first to third exemplary embodiments of the disclosure, among other things, the CPU 81 that runs the initialization control program stored in the ROM 82 to execute the reading control process (FIGS. 6 and 9) functions as an initialization operation control device. The initialization execution flag 86*a* functions as flag data. The EEPROM 86 functions as a storage device. The CPU 81 that runs the flag data control program stored in the ROM 82 functions as a flag data control device.

The flatbed mechanism including the read head 50 functions as an image reading device of a document mount type. The automatic document feeding mechanism including the read head 50 functions as an image reading device of a document conveying type. The platen glass 41 functions as a document mount surface. The drive circuit 51 and the stepping motor 52 for driving the read head 50 function as a scanning device. The automatic document feeder 33 functions as a document conveying device.

The ADF-side read position 23 functions as a read position and a first read position. The FB-side read starting position 24 functions as a read starting position and a second read position. The FB-side read end position 25 functions as a read end position and a third read position. The normal standby position 21 functions as a read standby position. The read reference position 22 functions as a read reference position.

While the disclosure has been described in detail with reference to the specific embodiments thereof, it would be apparent to those skilled in the art that various changes, arrangements and modifications may be applied therein without departing from the spirit and scope of the description.

In the above exemplary embodiments, among other things, EEPROM 86 is employed as the storage device in order to store the initialization execution flag 86*a*, the ADF initialization execution flag, the FB initialization execution flag, and the distance data which represents the distance between the current position of the read head 50 and the read reference position 22. Other storage devices can be adopted if the storage devices achieve a function of a nonvolatile memory (NVRAM) that maintains memory contents even when the power of the multifunctional machine 1 is turned off. Therefore, the initialization execution flag 86*a*, the ADF initialization execution flag, the FB initialization execution flag, and the distance data which represents the distance between the current position of the read head 50 and the read reference position 22, may be stored in other semiconductor memories such as flash memories, or magnetic bubble memories. In addition, the initialization execution flag 86*a*, the ADF initialization execution flag, the FB initialization execution flag, and the distance data which represents the distance between the current position of the read head 50 and the read reference position 22, may be stored in a volatile memory with a backup power.

In the reading control process of FIGS. 6 and 9, the details of the initialization of the automatic document feeding mechanism (S3, S33) are not limited to the processing shown in FIG. 7. Other processing may be performed if the automatic document feeding mechanism is effectively initialized. Likewise, the details of the initialization of the flatbed mechanism (S4, S34, S36) are not limited to the processing shown in FIG. 8. Other processing may be performed if the flatbed mechanism is effectively initialized. That is, the designers or users can arbitrarily and optimally set the details of the initialization of the automatic document feeding mechanism and the flatbed mechanism, according to the structures and specifications of the image reader.

In the above exemplary embodiments, among other things, the multifunctional machine 1 includes both the automatic document feeding mechanism and the flatbed mechanism. Alternatively, the multifunctional machine 1 may include one of the automatic document feeding mechanism and the flatbed mechanism. The multifunctional machine 1 may include a third reading mechanism in addition to the automatic document feeding mechanism and the flatbed mechanism. If the third reading mechanism is provided to the multifunctional machine 1, at the reading control process of FIG. 6, initialization of the third reading mechanism may be performed when the initialization execution flag 86*a* is "on" (S2:YES), in a similar manner to the initialization of the automatic document feeding mechanism (S3) and the flatbed mechanism (S4). At the reading control process of FIG. 9, when the initialization execution flag of the third reading mechanism is "on", predetermined third initialization may be performed.

At the reading control process of FIG. 6 according to the above-described embodiment, the content of the initialization execution flag 86*a* is determined at the start of a reading operation. When the initialization execution flag 86*a* is "on", the predetermined initialization operation is performed before a reading operation starts. When the initialization execution flag 86*a* is "off", a reading operation immediately starts without performing the initialization operation. The initialization operation needs to be performed until at least a reading operation starts after the power of the multifunctional machine 1 is turned on. Therefore, for example, the initialization execution flag 86*a* may be determined when the power of the multifunctional machine 1 is turned on, and the predetermined initialization operations may be performed when the initialization execution flag 86*a* is "on". In this case, it may be designed such that the initialization execution flag 86*a* is turned "off" when the initialization operations are finished. By doing so, the initialization operations will not be performed again at a next reading operation.

The image reader can be applied to various apparatuses and devices having an image reading function.

In some exemplary embodiments of the disclosure, an image reader may include an image reading device that is capable of reading a document; an initialization operation control device that performs an initialization operation before a reading operation starts, in order to return the image reading device to a standby position where the image reading device needs to be located until the reading operation starts; a storage device that stores flag data representing whether the initialization operation needs to be performed; and a flag data control device that controls the flag data. The flag data may represent necessity of execution of the initialization operation while the reading operation is performed by the image reading device. The flag data may represent nonnecessity of the execution of the initialization operation after the reading operation by the image reading device is finished. When the flag data represents the necessity of the execution of the initialization operation, the initialization operation control device performs the initialization operation. When the flag data represents the nonnecessity of the execution of the initialization operation, the initialization operation control device does not perform the initialization operation.

According to one aspect of the above-described exemplary embodiments of the disclosure, the flag data representing whether the initialization operation needs to be performed is provided in the storage device. While the reading operation is performed, the flag data is controlled to represent the necessity of the execution of the initialization operation. After the reading operation is finished, the flag data is controlled to represent the nonnecessity of the execution of the initialization operation. When the flag data represents the necessary of the execution of the initialization operation, the initialization operation is performed before the next reading operation starts. Accordingly, while the initialization operation is omitted when the previous reading operation is properly finished, the initialization operation is surely performed before the reading operation starts if the previous reading operation is interrupted in the middle of the operation. With this control, the processing time can be shortened and the power consumption can be reduced while the accuracy of reading operations is ensured.

In some exemplary embodiments of the disclosure, the storage device may include a nonvolatile memory that maintains its memory contents if power is turned off.

According to one aspect of the above-described exemplary embodiments of the disclosure, the content of the flag data is maintained by using the nonvolatile memory that maintains its memory contents if the power is turned off. Therefore, when the power is turned on, it can be determined whether a previous reading operation is properly finished.

In some exemplary embodiments of the disclosure, when the flag data represents the necessity of the initialization operation, the initialization operation control device may perform the initialization operation between the instance when the power is turned on and at least the instance when the reading operation starts. When the flag data represents the nonnecessity of the initialization operation, the initialization operation control device may not perform the initialization operation.

According to one aspect the above-described exemplary embodiments of the disclosure, while the initialization operation is omitted when the previous reading operation is properly finished, the initialization operation is surely performed between the instance when the power is turned on and at least the instance when the reading operation starts if the previous reading operation is interrupted in the middle of the operation. With this control, the processing time can be shortened and the power consumption can be reduced while the accuracy of reading operations is ensured.

In some exemplary embodiments of the disclosure, the image reader may further include a document conveying device that conveys the document through a read position where the image reading device can read the document. The image reading device may include a document conveying type image reading device that reads, at the read position, the document that is being conveyed by the document conveying device. The initialization operation control device drives the document conveying device by time required to discharge the document from a document conveying path, as the initialization operation.

According to one aspect of the above-described exemplary embodiments of the disclosure, the image reader performs the reading operation of the document conveying type. As the initialization operation, the document conveying device is driven by time required to discharge the document from the document conveying path. Accordingly, even when the previous reading operation is interrupted in the middle of the operation, the initialization operation can be surely performed so that any problems do not arise in the reading operation of the document conveying type.

In some exemplary embodiments of the disclosure, the image reader may further include a document mount surface on which the document is placed flat along its reading surface, and a scanning device that moves the image reading device along the reading surface from a read starting position to a read end position. The image reading device may include a document mount type image reading device that reads the document from the read starting position to the read end position while being moved by the scanning device. In the image reader, the initialization operation control device returns the image reading device to the standby position, by the scanning device, as the initialization operation.

According to one aspect of the above-described exemplary embodiments of the disclosure, the image reader performs the reading operation of the document mount method. As the initialization operation, the image reading device is returned to the standby position where the image reading device needs to be positioned until the reading operation starts. Accordingly, even when the previous reading operation is interrupted in the middle of the operation, the initialization operation can be surely performed so that any problems do not arise in the reading operation of the document mount type.

In some exemplary embodiments of the disclosure, the image reader may further include a document conveying device that conveys a first document through a first read position where the image reading device can read the first document, a document mount surface on which a second document is placed along a reading surface, and a scanning device that moves the image reading device to the first read position and further moves the image reading device between a second read position, at which a reading of the document placed on the document mount surface is started, and a third read position, at which the reading is finished. In the image reader, the image reading device reads the first document, which is being conveyed by the document conveying device, at the first read position, and is further moved by the scanning device to read the second document placed between the second read position and the third read position. The initialization operation control device drives the document conveying device by time required to discharge the first document from a document conveying path and returns the image reading device to the standby position, by the scanning device, as the initialization operation.

According to one aspect of the above-described exemplary embodiments of the disclosure, the image reader performs both the reading operation of the document conveying method and the reading operation of the document mount method. As the initialization operation, the document conveying device is driven by time required to discharge the document from the document conveying path and the image reading device is returned to the reading standby position where the image reading device needs to be located until the reading operation starts. Accordingly, even when the previous reading operation is interrupted in the middle of the operation, the initialization operation can be surely performed so that any problems do not arise in the reading operation of the document conveying type and the reading operation of the document mount type.

In some exemplary embodiments of the disclosure, the storage device may include a nonvolatile memory that maintains its memory contents if power is turned off. The storage device may store distance data which represents a distance between a current standby position of the image reading device and a read reference position, in correspondence with the flag data. The flag data control device may allow the storage device to store the distance between the current position of the image reading device and the read reference position, as the distance data, when controlling the flag data so that the flag data represents the necessity of the execution of the initialization operation. The scanning device may allow the image reading device to move based on the distance data stored in the storage device when the initialization operation does not need to be performed when the power is turned on.

According to one aspect of the above-described exemplary embodiments of the disclosure, the distance data, which represents the distance between the current position of the image reading device and the read reference position, is stored in the nonvolatile memory, in correspondence with the flag data. When the initialization operation does not need to be performed when the power is turned on, the image reading device moves based on the stored distance data. Accordingly, even when the current standby position of the image reading device is displaced from a proper standby position after the previous reading operation, the moving target position of the image reading device can be precisely controlled.

In some exemplary embodiments of the disclosure, the flag data control device may allow the storage device to maintain the flag data that represents the nonnecessity of the execution of the initialization operation, when the image reading device reaches a predetermined position.

According to one aspect of the above-described exemplary embodiments of the disclosure, the information that the initialization operation does not need to be performed can be surely stored in the storage device.

What is claimed is:

1. An image reader, comprising:
an image reading device for reading a document;
an initialization operation control device that performs an initialization operation in which the image reading device moves to a standby position where the image reading device needs to be located prior to a start of the reading operation;
a storage device that stores flag data representing whether the initialization operation needs to be performed; and
a flag data control device that controls the flag data, the flag data representing necessity of execution of the initialization operation while the reading operation is performed by the image reading device and the flag data representing nonnecessity of the execution of the initialization operation after the reading operation by the image reading device is finished, wherein, when the flag data represents the necessity of the execution of the initialization operation, the initialization operation control device performs the initialization operation; and when the flag data represents the nonnecessity of the execution of the initialization operation, the initialization operation control device does not perform the initialization operation.

2. The image reader according to claim 1, wherein the storage device includes a nonvolatile memory that maintains memory contents if power is turned off.

3. The image reader according to claim 2, wherein, when the flag data represents the necessity of the initialization operation, the initialization operation control device performs the initialization operation between the instance when the power is turned on and at least the instance when the reading operation starts; and when the flag data represents the nonnecessity of the initialization operation, the initialization operation control device does not perform the initialization operation.

4. The image reader according to claim 1, further comprising a document conveying device that conveys the document through a read position where the image reading device can read the document, wherein the image reading device includes a document conveying type image reading device that reads, at the read position, the document that is being conveyed by the document conveying device; and the initialization operation control device drives the document conveying device by time required to discharge the document from a document conveying path, as the initialization operation.

5. The image reader according to claim 1, further comprising:
a document mount surface on which the document is placed flat along a reading surface; and
a scanning device that moves the image reading device along the reading surface from a read starting position to a read end position, wherein the image reading device includes a document mount type image reading device that reads the document from the read starting position to the read end position while being moved by the scanning device; and the initialization operation control device returns the image reading device to the standby position, by the scanning device, as the initialization operation.

6. The image reader according to claim 1, further comprising:
a document conveying device that conveys a first document through a first read position where the image reading device can read the first document;
a document mount surface on which a second document is placed along a reading surface; and
a scanning device that moves the image reading device to the first read position and further moves the image reading device between a second read position, at which a reading of the document placed on the document mount surface is started, and a third read position, at which the reading is finished, wherein the image reading device reads the first document, which is being conveyed by the document conveying device, at the first read position, and is further moved by the scanning device to read the second document placed between the second read position and the third read position; and the initialization operation control device drives the document conveying device by time required to discharge the first document from a document conveying path and returns the image reading device to the standby position, by the scanning device, as the initialization operation.

7. The image reader according to claim 5, wherein the storage device includes a nonvolatile memory that maintains memory contents if power is turned off, and stores distance data which represents a distance between a current standby position of the image reading device and a read reference position, based on the flag data; the flag data control device allows the storage device to store the distance between the current position of the image reading device and the read reference position, as the distance data, when controlling the flag data so that the flag data represents the necessity of the execution of the initialization operation; and the scanning device allows the image reading device to move based on the distance data stored in the storage device when the initialization operation does not need to be performed when the power of the image reader is turned on.

8. The image reader according to claim 1, wherein the flag data control device allows the storage device to maintain the flag data that represents the nonnecessity of the execution of the initialization operation, when the image reading device reaches a predetermined position.

9. An image reader method for reading an image from a document, the method comprising:

reading a document from an image reading device;

performing an initialization operation with an initialization operation control device, wherein the image reading device moves to a standby position where the image reading device needs to be located prior to the reading operation starts;

storing flag data in a storage device, the flag data representing whether the initialization operation needs to be performed; and controlling the flag data with a flag data control device, the flag data representing necessity of execution of the initialization operation while the reading operation is performed by the image reading device and the flag data representing nonnecessity of the execution of the initialization operation after the reading operation by the image reading device is finished, wherein when the flag data represents the necessity of the execution of the initialization operation, the initialization operation control device performs the initialization operation; and when the flag data represents the nonnecessity of the execution of the initialization operation, the initialization operation control device does not perform the initialization operation.

10. The method according to claim 9, wherein storing the flag data on the storage device includes maintaining memory contents in a nonvolatile memory if power is turned off.

11. The method according to claim 9, wherein using the flag data representing the necessity of the initialization operation causes the initialization operation control device to perform the initialization operation between the instance when the power is turned on and at least the instance when the reading operation starts; and using the flag data representing the nonnecessity of the initialization operation causes the initialization operation control device not to perform the initialization operation.

12. The method according to claim 9, further comprising the step of conveying the document through a read position using a document conveying device so that the image reading device can read the document, wherein reading the document using the image reading device includes a document conveying type image reading device that reads, at the read position; and driving the document conveying device with the initialization operation control device using the time required to discharge the document from a document conveying path, as the initialization operation.

13. The method according to claim 9, further comprising:

placing the document flat along a document mount surface; and moving the image reading device along a reading surface from a read starting position to a read end position using a scanning device, wherein the image reading device includes a document mount type image reading device that reads the document from the read starting position to the read end position; and the initialization operation control device returns the image reading device to the standby position, as the initialization operation.

14. The method according to claim 9, further comprising:

conveying a first document through a first read position using a document conveying device so that the image reading device can read the first document;

placing a second document on a document mount surface; and using a scanning device to move the image reading device to the first read position and to move the image reading device between a second read position, at which a reading of the document placed on the document mount surface is started, and a third read position, at which the reading is finished, wherein the image reading device reads the first document at the first read position, and reads the second document placed between the second read position and the third read position; and the initialization operation control device drives the document conveying device by time required to discharge the first document from a document conveying path and returns the image reading device to the standby position, as the initialization operation.

15. The method according to claim 13, wherein using the storage device includes maintaining memory contents in a nonvolatile memory, and storing distance data representing a distance between a current standby position of the image reading device and a read reference position base on the flag data; using the flag data control device to allow the storage device to store the distance between the current position of the image reading device and the read reference position, as the distance data, when controlling the flag data so that the flag data represents the necessity of the execution of the initialization operation on the storage device; and using the scanning device to allow the image reading device to move based on the distance data stored in the storage device when the initialization operation does not need to be performed when the power of the image reader is turned on.

16. The method according to claim 9, wherein using the flag data control device allows the storage device to maintain the flag data representing the nonnecessity of the execution of the initialization operation, when the image reading device reaches a predetermined position.

17. An image reader, comprising:

an image reading device;

an initialization operation control device performing an initialization operation in which the image reading device moves to a standby position prior to the reading operation starts;

storing means for storing flag data representing whether the initialization operation needs to be performed; and controlling means for controlling the flag data representing necessity of execution of the initialization operation while the reading operation is being performed by the image reading device and representing nonnecessity of the execution of the initialization operation after the reading operation is finished by the image reading device.

18. The image reader according to claim 17, further comprising a conveying means for conveying the document through a read position where the image reading device can read the document, wherein the image reading device includes a document conveying type image reading device that reads, at the read position, the document is being conveyed; and the initialization operation control device drives the conveying device using a time required to discharge the document from a document conveying path, as the initialization operation.

19. The image reader according to claim 17, further comprising:

placing means for placing the document along a reading surface; and moving means for moving the image reading device along the reading surface from a read starting position to a read end position, wherein a document mount type image reading device reads the document from the read starting position to the read end position; and the initialization operation control device returns the image reading device to the standby position, as the initialization operation.

20. The image reader according to claim 17, further comprising:

conveying means for conveying a first document through a first read position where the image reading device can read the first document;

placing means for placing a second document along a reading surface;

moving means for moving the image reading device to the first read position and between a second read position, at which a reading of the document is started, and a third read position, at which the reading is finished; and driving means for driving the conveying means using a time required to discharge the first document from a document conveying path and returning the image reading device to the standby position, as the initialization operation, wherein the image reading device reads the first document at the first read position, and reads the second document placed between the second read position and the third read position.

* * * * *